Dec. 8, 1931. J. V. DYRR 1,835,288
SPIKE TOOTH HARROW
Filed Dec. 26, 1928
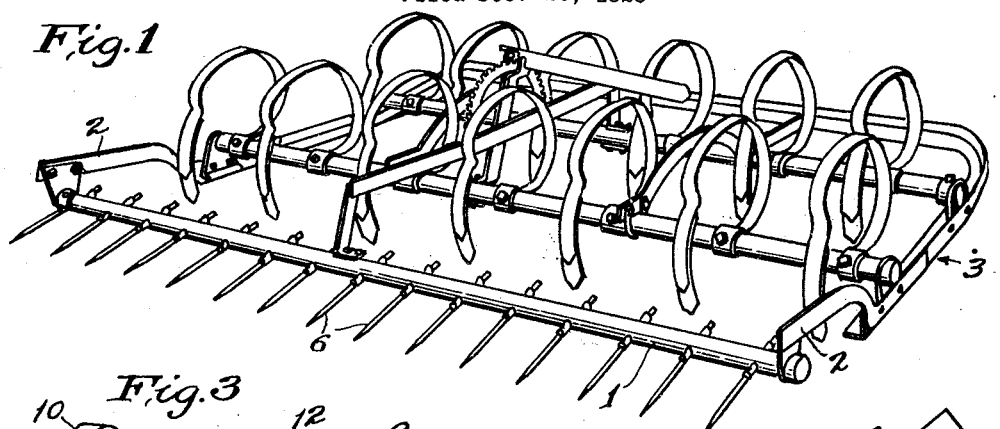
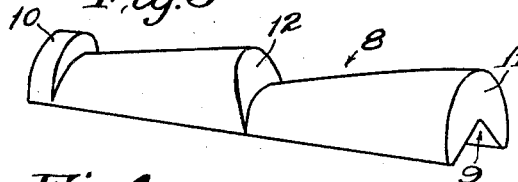
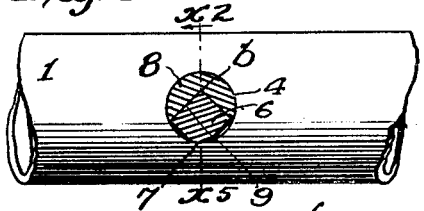
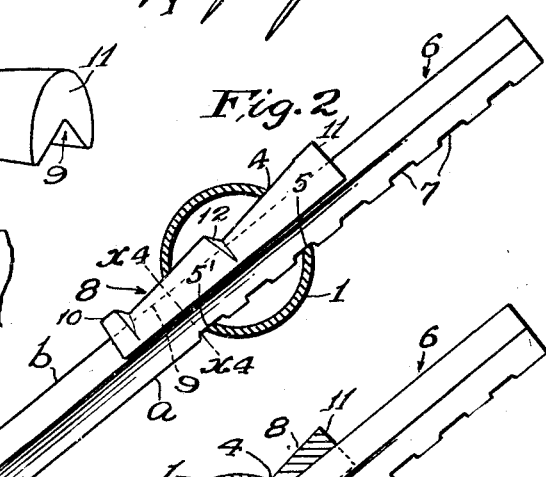
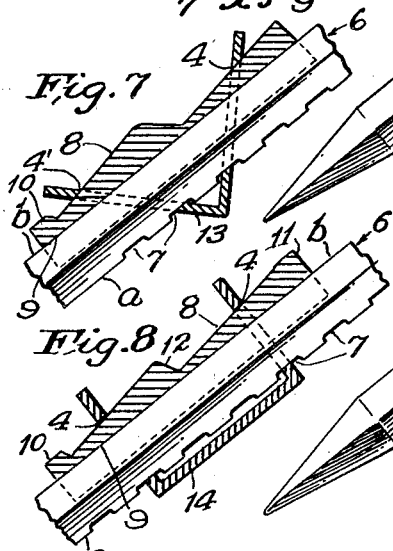
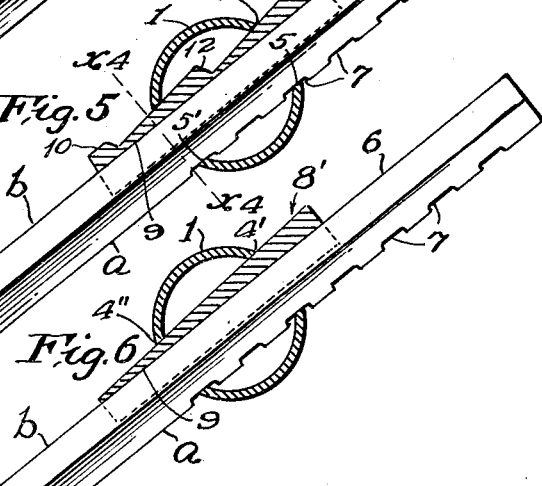
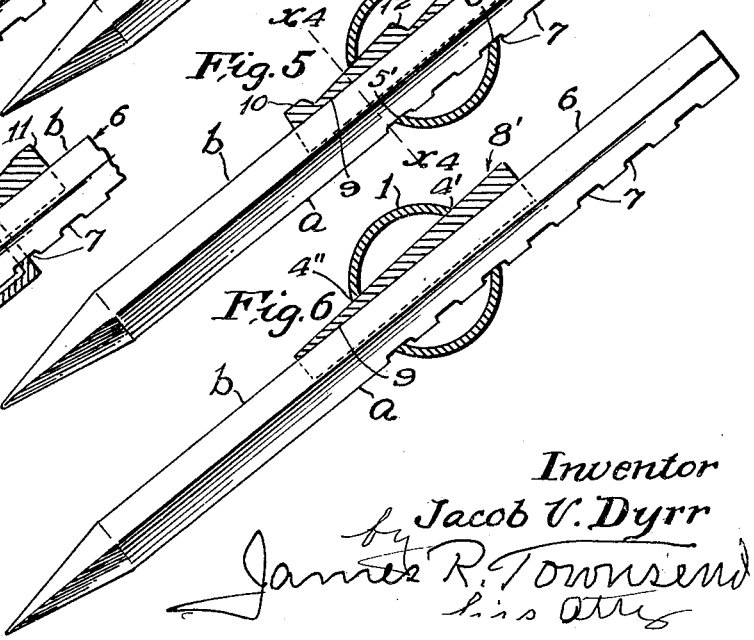
Witness
C. H. Whitmore
Inventor
Jacob V. Dyrr
by James R. Townsend
his atty Patented Dec. 8, 1931

1,835,288

UNITED STATES PATENT OFFICE

JACOB V. DYRR, OF BELL, CALIFORNIA

SPIKE TOOTH HARROW

Application filed December 26, 1928. Serial No. 328,514.

An object of the invention is to provide more effective means for fastening and adjusting the spike harrow teeth to the crossbar of the harrow.

The invention is applicable to various forms of cross-bars, such as channel irons, angle irons or metal tubes, the principle of the invention being that I provide the bar with a spike tooth support having seats at its opposite sides spaced apart to seat the tooth at two open-space-separated places along its length and provide a key, one side of which is adapted to engage one side of the tooth, and the other side of which is provided with two inclined faces for contact with the cross-bar open-space-separated seats on opposite sides of the axis thereof, so that the seating of the spike tooth in the open-space separated seats therefor may be uniform and so that the key will fit tightly between the tooth and the seats on the opposite sides of the bar thus to give a double purchase for the tooth and prevent any looseness or lost motion.

Preferably I employ a gas pipe of suitable diameter for the cross-bar, and the seats are made by boring through the cross-bar at suitable intervals, holes of one diameter so that there are at each boring, two separated seats on which the spike tooth will rest, and there are thus provided two purchases against which the two wedges of the key will act to wedge the tooth onto the two seats on the opposite sides of the cross-bar. I thus provide in the cross-bar at each hole two sets of open space-separated seats and thus increase the frictional bearings for each tooth and its wedge.

In lieu of the preferred construction having opposite holes of the same diameter, the bar may be provided with holes of different diameters so that a wedge, the faces of which are straight from end to end of the wedge, may be employed, care being taken that the relative angularity of the faces is such that when the wedge is driven home at the side of the tooth, it will fit tightly; both the wedge and the tooth being in frictional contact with open-space-separated seats for such elements respectively.

Cheapness and simplicity, and ease of applying and removing the tooth are further objects of the invention.

Another feature of the invention resides in providing the spike tooth with recesses to engage the space-separated frictional seats so that when the key is driven home, the tooth is wedged in place with its notches engaging the spaced apart frictional spike seats of the cross-bar.

In the preferred construction the teeth are square in cross section and the key has an angular channel to fit on one corner or edge of the tooth, and the opposite corner or edge of the tooth is notched to fit onto the tooth seats formed by the edges of the two holes in the cross bar.

The invention includes the assembly and parts and combinations hereinafter set forth and claimed.

An object is insurance against accidental loosening of the teeth, and ease of applying, removing, and replacing the teeth.

An object is to facilitate the removal of the keys, and to guard against injuring or premature destruction thereof in the course of removal.

Other objects, advantages and features of invention may appear from the accompanying drawings, the subjoined detailed description and the appended claims.

The accompanying drawings illustrate the invention.

Figure 1 is a perspective view illustrating the invention as applied at the rear end of the frame of a spring tooth harrow having a tooth bar made of a piece of gas pipe.

Fig. 2 is a detail of the device with the cross bar in section in the plane indicated by line $x2$—$x5$, Fig. 4.

Fig. 3 is a perspective view of the duplex key detached.

Fig. 4 is a detail of the invention in section on the plane indicated by line $x4$—$x4$, Figs. 2 and 5.

Fig. 5 is a detail showing the key, as well as the cross bar in section on line $x2$—$x5$, Fig. 4.

Fig. 6 is a view analogous to Fig. 5 showing the form in which the external face of the key is longitudinally straight.

Fig. 7 is a view of an angle iron cross bar provided with a tooth seated in accordance with this invention.

Fig. 8 is a transverse section of a channel iron bar provided with my improvement.

The transverse hollow cylindrical harrow tooth-bar 1 is rigidly and non-rotatably connected to arms 2 by which the tooth bar is rigidly fixed to the main harrow frame 3. 4 indicates circular holes through the tooth bar, providing open-space-separated tooth engaging seats as at 5 and 5', against one side of which the harrow spike tooth 6 will rest when such tooth is in operative position as in Figs. 1, 2, 5, 6, 7, 8.

The harrow spike tooth is shown as mainly rectangular in cross section and is provided in one of its longitudinal angles *a* with notches 7 that are spaced apart in conformity with the spaces between the seats 5, 5' formed at the edges of the bar 2 by the holes 4, through the bar, and with the exception of such notches, is smooth and straight from the heel to the usual point.

The preferred means to secure the tooth in its seat is a channelled double wedge key 8 driven home, to fit friction tight between the space-separated seats of one side of the hole in the bar and the straight edge *b* of the spike tooth, opposite the notched angle *a*. The notches 7 engaging the separated seats insure against the parts becoming loose or falling out when the wedges are in place.

The channel 9 of the key is conformed to a corner and two adjacent faces of the peg tooth, and the outer face of the key is transversely arcuate, and longitudinally stepped with wedge-like faces to simultaneously wedge against the two seats on one side of the hole, thus forcing the peg tooth against the seats therefor.

The smaller end of the double wedge 8 is provided with a reinforcement in the form of a flange or a bead 10, thus to afford a suitable head which may be struck by a hammer or other instrument in the operation of loosening the wedge from the tooth. The large ends 11 and 12 of the wedges serve a like purpose for driving the wedge in the operation of tightening the tooth.

In Fig. 6 the holes 4' and 4'' are of different diameters so that when the straight wedge key 8' is driven home it will engage the edges of the two holes, thus to secure the tooth in place.

In Fig. 7, 13 indicates an angle bar employed in place of the cylindrical bar 1; and in Fig. 8, 14 indicates a channel bar adapted to a like purpose. Each of the bars, however, has holes as above described, affording at each hole two sets of seats, there being in each instance two seats for each tooth, and two seats for each wedge.

I claim:—

1. The combination with a harrow cross-bar having a transverse opening provided with seats spaced apart at opposite sides of the cross-bar; a peg extending through the opening and engaging the seats, and a wedge key adapted to engage the seats respectively to force the tooth into contact with the opposite edges of the opening.

2. The combination with a cross-bar, having a transverse opening provided with seats at opposite edges of the cross-bar; a spike tooth having notches along one side to engage the seats in the opening and a wedge key adapted to force the tooth onto the seats.

3. The combination with a harrow cross-bar having a transverse opening provided with seats spaced apart at opposite sides of the cross-bar; a spike tooth extending through the opening and engaging the seats, and a wedging key adapted to engage the seats respectively to force the tooth into contact with the opposite edges of the opening.

4. The combination of a hollow cylindrical harrow cross-bar having a transverse opening provided with seats spaced apart at opposite sides of the cross-bar; a spike tooth extending through the opening and engaging the seats, and a wedge key adapted to engage the seats respectively to force the tooth into contact with the opposite edges of the opening.

5. The combination of a cylindrical harrow cross-bar having a transverse opening provided with seats spaced apart at opposite sides of the cross-bar; a spike tooth extending through the opening and engaging the seats, and a wedge key adapted to engage the seats respectively to force the tooth into contact with the opposite edges of the opening.

In testimony whereof, I have hereunto set my hand at Los Angeles, California, this 4th day of December, 1928.

JACOB V. DYRR.